United States Patent
Törnquist et al.

(10) Patent No.: US 11,366,075 B2
(45) Date of Patent: Jun. 21, 2022

(54) METHOD FOR DETERMINING AN AMOUNT OF DEPOSITION OF SCALE ON A HEATING ELEMENT AND HOUSEHOLD APPLIANCE COMPRISING A HEATING ELEMENT

(71) Applicant: ELECTROLUX APPLIANCES AKTIEBOLAG, Stockholm (SE)

(72) Inventors: Vendela Törnquist, Stockholm (SE); Johan Waldebäck, Stockholm (SE)

(73) Assignee: Electrolux Appliances Aktiebolag

( * ) Notice: Subject to any disclaimer, the term of this patent is extended or adjusted under 35 U.S.C. 154(b) by 288 days.

(21) Appl. No.: 16/500,866

(22) PCT Filed: Apr. 28, 2017

(86) PCT No.: PCT/EP2017/060211
§ 371 (c)(1),
(2) Date: Oct. 4, 2019

(87) PCT Pub. No.: WO2018/197001
PCT Pub. Date: Nov. 1, 2018

(65) Prior Publication Data
US 2020/0033277 A1    Jan. 30, 2020

(51) Int. Cl.
*G01N 25/00*    (2006.01)
*G01N 25/72*    (2006.01)
(Continued)

(52) U.S. Cl.
CPC .......... *G01N 25/72* (2013.01); *A47L 15/4285* (2013.01); *G01N 25/08* (2013.01); *G05D 23/1904* (2013.01)

(58) Field of Classification Search
CPC combination set(s) only.
See application file for complete search history.

(56) References Cited

U.S. PATENT DOCUMENTS

| | | |
|---|---|---|
| 4,762,055 A | 8/1988 | Shimomura |
| 2008/0317091 A1 | 12/2008 | Siddons |

(Continued)

FOREIGN PATENT DOCUMENTS

| | | | |
|---|---|---|---|
| CN | 105485893 A | * | 4/2016 |
| DE | 600 31 520 T2 | | 6/2007 |

(Continued)

OTHER PUBLICATIONS

EPO Translation of DE60031520 (Year: 2007).*
International Search Report and Written Opinion for Application No. PCT/EP2017/060211 dated Jan. 16, 2018, 11 pages.

*Primary Examiner* — Lisa M Caputo
*Assistant Examiner* — Nasir U. Ahmed
(74) *Attorney, Agent, or Firm* — RatnerPrestia

(57) ABSTRACT

A household appliance and method for determining if an amount of deposition of scale exceeds a reference amount of deposition of scale may include obtaining a start temperature of a heating element, turning on the heating element at first point in time to heat the liquid from the liquid start temperature and simultaneously starting measuring a time interval from the first point in time, monitoring, at a second point in time, a behavior of the measured temperature of the heating element during heating of the liquid in the heating space in order to determine if a boiling temperature of the liquid has been reached, comparing the measured time interval with a reference heating duration and determining if the amount of deposition of scale on the heating element exceeds the reference amount of deposition of scale.

11 Claims, 3 Drawing Sheets

(51) Int. Cl.
*A47L 15/42* (2006.01)
*G01N 25/08* (2006.01)
*G05D 23/19* (2006.01)

(56) References Cited

U.S. PATENT DOCUMENTS

2016/0015238 A1* 1/2016 Ju .................. A47L 15/0023
　　　　　　　　　　　　　　　　　　　　134/25.2
2019/0010656 A1* 1/2019 Kim ................. A47L 15/0049

FOREIGN PATENT DOCUMENTS

| EP | 0 380 369 A1 | 8/1990 |
| EP | 2 165 243 B1 | 2/2014 |
| GB | 2 109 097 A | 5/1983 |

* cited by examiner

METHOD FOR DETERMINING AN AMOUNT OF DEPOSITION OF SCALE ON A HEATING ELEMENT AND HOUSEHOLD APPLIANCE COMPRISING A HEATING ELEMENT

CROSS-REFERENCE TO RELATED APPLICATIONS

This application is a national stage application filed under 35 U.S.C. § 371 of International Application No. PCT/EP2017/060211 filed Apr. 28, 2017 and published as WO2018197001, which application is hereby incorporated by reference herein in its entirety.

TECHNICAL FIELD

Embodiments herein relate to detection of scale on heating elements. In particular, the embodiments herein relate to a method for determining if an amount of deposition of scale, on a heating element arranged for heating a liquid in a household appliance, exceeds a reference amount of deposition of scale or not. Further the embodiments herein relate to a household appliance comprising a heating element.

BACKGROUND

Water heating elements in household appliances, as for example dishwashers or washing machines, are used to heat water to some desired temperature. In areas where a heating element contacts water, scale will tend to form on the heating element such that a layer of scale is accumulated over time which slowly reduces the heating ability of the heating element. This is particularly the case in areas where the water supplied is so-called hard water, i.e. water containing some percentage of calcium and magnesium carbonates, bicarbonates, sulphates or chlorides due to long contact with rocky substrates.

Scale formed on a heating element makes the element less efficient and may further result in permanent damage of the heating element. This can be avoided by descaling the heating element once it can be detected that scale is present on the heating element.

One conventional scale detection method relies on measuring the actual running temperature of a heating element during boiling and comparing the achieved temperature with a predetermined value.

US20080317091 describes a method for detecting presence of scale on a heating element, where a signal describing the heating element temperature decrease is analysed and presence of scale is indicated if the temperature decrease is greater than a predetermined value.

EP2165243 describes a method for detecting boiling of water heated by a heating element by analysing temperature of the heating element. According to the document scale contamination may be detected as a function of absolute temperature of the heating element at boiling.

However, the above known methods are not very accurate and reliable and they also require a measurement procedure during boiling of water. Heating of water to boiling temperature by a heating element with scale contamination may cause damage of the heating element.

SUMMARY

An object of the embodiments herein is to provide an improved method for determining if an amount of deposition of scale on a heating element arranged for heating a liquid in a heating space of the household appliance exceeds a reference amount of deposition of scale or not.

According to an aspect, a method is provided for determining if an amount of deposition of scale, on a heating element arranged for heating a liquid in a heating space of a household appliance, exceeds a reference amount of deposition of scale or not.

Because, the heating element is arranged to heat the liquid in a heating space a transfer of thermal energy between the heating element and the liquid is possible.

The method comprises: measuring temperature of the heating element, obtaining a start temperature of the heating element, wherein the start temperature of the heating element corresponds to a liquid start temperature of the liquid in said heating space.

The temperature of the heating element is measured continuously after the household appliance has been turned on. Thereby the temperature of the heating element may be measured before and after that the heating element has been turned on and after the heating element has been turned off.

The liquid start temperature may be obtained by measuring the start temperature of the heating element. This because, after the liquid has been supplied to the heating space and before the heating element has been turned on, the temperature of the liquid in the heating space and temperature of the heating element will attain an average value common for the liquid in the heating space and for the heating element. The average value of the temperature will be achieved when steady state is reached in the heating space after the liquid has been supplied to the heating space.

Thereby temperature of the heating element measured before the heating element has been turned on will correspond to temperature of the liquid in the heating space. In this way, the liquid start temperature is obtained by obtaining the start temperature of the heating element. Thus, the liquid start temperature is obtained in a simple way by measuring the start temperature of the heating element and without any additional measurements of temperature of the liquid in the heating space.

Further, the method comprises turning on the heating element at first point in time to heat the liquid from the liquid start temperature and simultaneously starting measuring a time interval from the first point in time, monitoring, at a second point in time, a behaviour of the measured temperature of the heating element during heating of the liquid in the heating space in order to determine if a boiling temperature of the liquid has been reached or not, wherein the time interval is measured to the second point in time.

The behaviour, which may also be called characteristic of the measured temperature of the heating element, describes how the temperature of the heating element changes during heating of the liquid. In other words, the behaviour illustrates how the heating element reacts during heating of the liquid. Thus, properties and conditions of the heating element may thereby be described by determining and analysing the behaviour of the temperature of the heating element during heating of the liquid.

The behaviour is obtained by measuring values of the temperature of the heating element which measured values of the temperature may be illustrated as a plot or a chart, for example a line chart.

As mentioned before, by analysing the behaviour of the temperature of the heating element during heating of the liquid different properties and conditions of the heating element may be described. Further, the behaviour of the temperature of the heating element during heating of the liquid may be used to determine the boiling temperature of the liquid. Thus, the boiling temperature of the liquid may be determined in a simple manner by analysing the behaviour of the temperature of the heating element during heating of the liquid.

The method further comprises comparing the measured time interval with a reference heating duration required for heating the liquid from the liquid start temperature to the boiling temperature of the liquid when heated by a reference heating element having the reference amount of deposition of scale.

The reference heating duration is obtained when heating the liquid from the liquid start temperature to the boiling temperature of the liquid by a reference heating element having the reference amount of deposition of scale. With reference amount of deposition of scale is meant that the amount of deposition of scale is low, i.e. is low enough to consider the heating element almost free from the deposition of scale, for example when the heating element is new. Thus, an amount of deposition of scale below the reference amount of deposition of scale or equal the reference amount of deposition of scale on is considered do not affect significantly the function of the heating element during normal operation of the heating element.

Consequently, the measured time interval is compared with the reference heating duration describing the reference heating element.

The reference heating duration may be obtained using the reference heating element before the reference heating element has been mounted in a household appliance, for example at a manufacturer of the heating element. As an alternative, the reference heating duration may be obtained when the reference heating element is used for the first time in the household appliance. Thus, the reference amount of deposition of scale may be zero.

Further, the method comprises determining if the amount of deposition of scale on the heating element exceeds the reference amount of deposition of scale or not based on the monitoring and on the comparison. With, the amount of deposition of scale is meant for example a thickness of a layer of deposition on the heating element or a rate of deposition in relation to a whole area of the heating element. Thus, by monitoring of the behaviour of the temperature of the heating element during heating of the liquid the boiling temperature of the liquid may be detected. This, together with comparison of the measured time interval with the reference heating duration may give an answer if and/or when the boiling temperature of the liquid occurs in relation to the reference heating duration.

Deposition of scale on a heating element affects temperature behaviour of the heating element during heating. Deposition of scale on a heating element affects also when a boiling temperature of a liquid heated by the heating element will be reached and at which temperature of the heating element. The more deposition of scale, the faster temperature increase of the heating element and the higher temperature of the heating element at boiling temperature of the liquid because the deposition of scale prevents a transfer of heat from the heating element to the liquid. The deposition of scale causes a part of heating energy to remain within the deposition of scale, which contributes to increase of temperature of the heating element. High temperature of the heating element at boiling temperature of the liquid is affected because of deposition of scale exceeding the reference amount of deposition of scale may cause damage of the heating element.

Thus, by monitoring the behaviour of the temperature of the heating element and by comparing the measured time interval with the reference heating duration a simple and reliable method for determined if an amount of deposition of scale, on the heating element exceeds a reference amount of deposition of scale or not is achieved. Further, by this method, the heating element does not need to be heated up to temperature of the heating element that may cause damage of the heating element in order to detect if the amount of deposition of scale, exceeds a reference amount of deposition of scale or not, as presented in the prior art documents.

Consequently, an improved method for determining if an amount of deposition of scale on a heating element arranged for heating a liquid in a household appliance exceeds a reference amount of deposition of scale or not is achieved.

As a result, the above mentioned object can be achieved.

The method may comprise indicating that the amount of deposition of scale on the heating element does not exceed the reference amount of deposition of scale if the monitoring of the behaviour of the temperature of the heating element indicates that the boiling temperature of the liquid has been reached and the comparison indicates that the measured time interval is less or equal the reference heating duration. Thus, with other words the boiling temperature of the liquid is detected within the reference heating duration when monitoring the behaviour of the temperature of the heating element and when comparing the measured time interval with the reference heating duration. This indicates that the deposition of scale on the heating element does not exceed the reference amount of deposition of scale, which reference deposition of scale relates to a reference heating element considered not affected by the deposition of scale significantly, as for example when the heating element is new. Thereby, it may be concluded that the amount of deposition of scale on the heating element does not exceed the reference amount of deposition of scale and the heating element may be used for further heating of the liquid.

Optionally, the method may comprise indicating that the amount of deposition of scale on the heating element exceeds the reference amount of deposition of scale if the monitoring of the behaviour of the temperature of the heating element indicates that the boiling temperature of the liquid has not been reached and the comparison indicates that the measured time interval is greater than the reference heating duration. Thus, with other words the boiling temperature of the liquid has not been detected within the reference heating duration when monitoring the behaviour of the temperature of the heating element and when comparing the measured time interval with the reference heating duration. This may be caused by an amount of deposition of scale on the heating element that exceeds the reference amount of deposition, which the amount of deposition of scale may prevent transfer of heat from the heating element to the liquid. Thereby, the fact that the reference heating duration has expired and no boiling temperature of the liquid has been determined indicates that the reference amount of deposition of scale on the heating element may have been exceeded. This means that the scale deposition on the heating element, in form of for example a layer with a thickness, exceeds a reference amount of the deposition of scale and a descaling process may be recommended in order to remove the deposition of scale from the heating element.

As an alternative, the method may comprise estimating an additional amount of the deposition of scale exceeding said reference amount of deposition of scale on the heating element as a function of a difference between the measured time interval and the reference heating duration. With the additional amount of the deposition of scale is meant an amount of the deposition of scale that is higher or greater than the reference amount of deposition of scale, i.e. for example the thickness or rate of the additional amount of the deposition is higher than the reference amount of deposition. Thus, when a deposition of scale exceeding a reference amount of deposition of scale has been determined as described above, the heating may be continued and the additional amount of the deposition of scale exceeding said reference amount of deposition of scale on the heating element may be estimated. i.e. calculated, as a function of a difference between the measured time interval and the reference heating duration. Thereby, the additional amount of the deposition of scale exceeding said reference amount of deposition of scale on the heating element may be estimated in a simple manner by using the difference between the measured time interval and the reference heating duration.

The reference heating duration is obtained when heating the liquid by the reference heating element powered by electricity at a first value of voltage, wherein the heating element is powered by electricity and the method may comprise controlling of voltage at the heating element to achieve a second value of voltage substantially equal the first value of voltage. By this the heating element is powered by electricity at substantially the same value of voltage as the reference heating element. Thereby even more improved method for determining if the amount of deposition of scale on the heating element exceeds the reference amount of deposition of scale or not is provided.

Optionally, the reference heating duration may be obtained before the method is performed. Thus, the reference heating duration may be obtained before mounting of the reference heating element in the household appliance, for example at a manufacturer of the heating element. The reference heating duration may then be obtained for different liquid start temperatures and at different values of voltage at the reference heating element. The reference heating duration may be provided as a table data, for example in form of software.

Another object of the embodiments herein is to provide an improved household appliance configured to perform the improved method for determining if an amount of deposition of scale on a heating element arranged for heating a liquid in a household appliance exceeds a reference amount of deposition of scale or not. The method has been described above.

According to another aspect a household appliance comprising a heating element arranged for heating a liquid in a heating space of the household appliance is provided. The household appliance further comprises a sensor arranged to measure temperature of the heating element and a control unit arranged in connection with the heating element and with the sensor. The control unit being configured to control operation of the household appliance to accomplish one or more of the above-mentioned embodiments.

The sensor and the control unit being configured to:
measure temperature of the heating element,
obtain a start temperature of the heating element, wherein the start temperature corresponds to a liquid start temperature of the liquid in the heating space,
turn on the heating element at first point in time to heat the liquid from the liquid start temperature and simultaneously start measuring a time interval from the first point in time,
monitor, at a second point in time, a behaviour of the measured temperature of the heating element during heating of the liquid in the heating space in order to determine if a boiling temperature of the liquid has been reached or not, wherein the time interval is measured to the second point in time,
compare the measured time interval with a reference heating duration required for heating the liquid from the liquid start temperature to the boiling temperature of the liquid when heated by a reference heating element having the reference amount of deposition of scale and
determine if the amount of deposition of scale on the heating element exceeds the reference amount of deposition of scale or not based on the monitoring and on the comparison.

Thus, by monitoring of the behaviour of the temperature of the heating element and by comparing the measured time interval with the reference heating duration it may be determined if an amount of deposition of scale, on the heating element exceeds a reference amount of deposition of scale or not. Thereby, the heating element does not need to be heated up to temperature of the heating element that may cause damage of the heating element in order to detect if the amount of deposition of scale exceeds a reference amount of deposition of scale or not, as presented in the prior art documents.

Consequently, an improved household appliance is provided.

As a result, the above mentioned object can be achieved.

Optionally, the household appliance may further be configured to perform the alternative steps in the method as described above.

Further features and advantages of the embodiments herein will become apparent when studying the appended claims and the following detailed description. Those skilled in the art will realize that the different features described may be combined to create embodiments other than those described in the following, without departing from the scope defined by the appended claims.

BRIEF DESCRIPTION OF THE DRAWINGS

The various aspects mentioned above, including their particular features and advantages, will be readily understood from the following detailed description and the accompanying drawings, in which.

DETAILED DESCRIPTION

The embodiments herein will now be described in more detail with reference to the accompanying drawings, in which example embodiments are shown. Disclosed features of example embodiments may be combined. Like numbers refer to like elements throughout. Well-known functions or constructions will not necessarily be described in detail for brevity and/or clarity.

Figure 1:
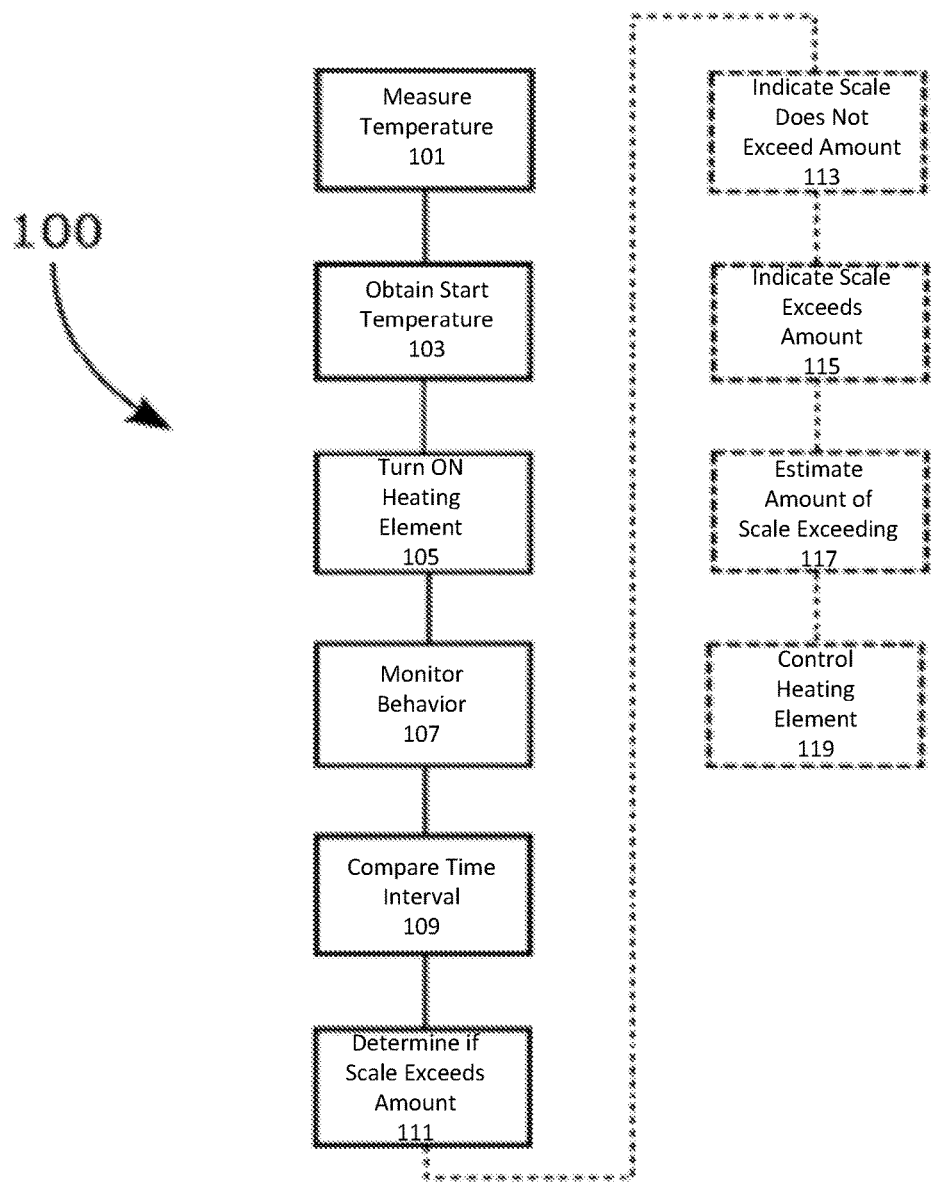
FIG. 1 is a flow chart illustrating a method for determining if an amount of deposition of scale on a heating element exceeds a reference amount of deposition of scale or not.
Figure 3:
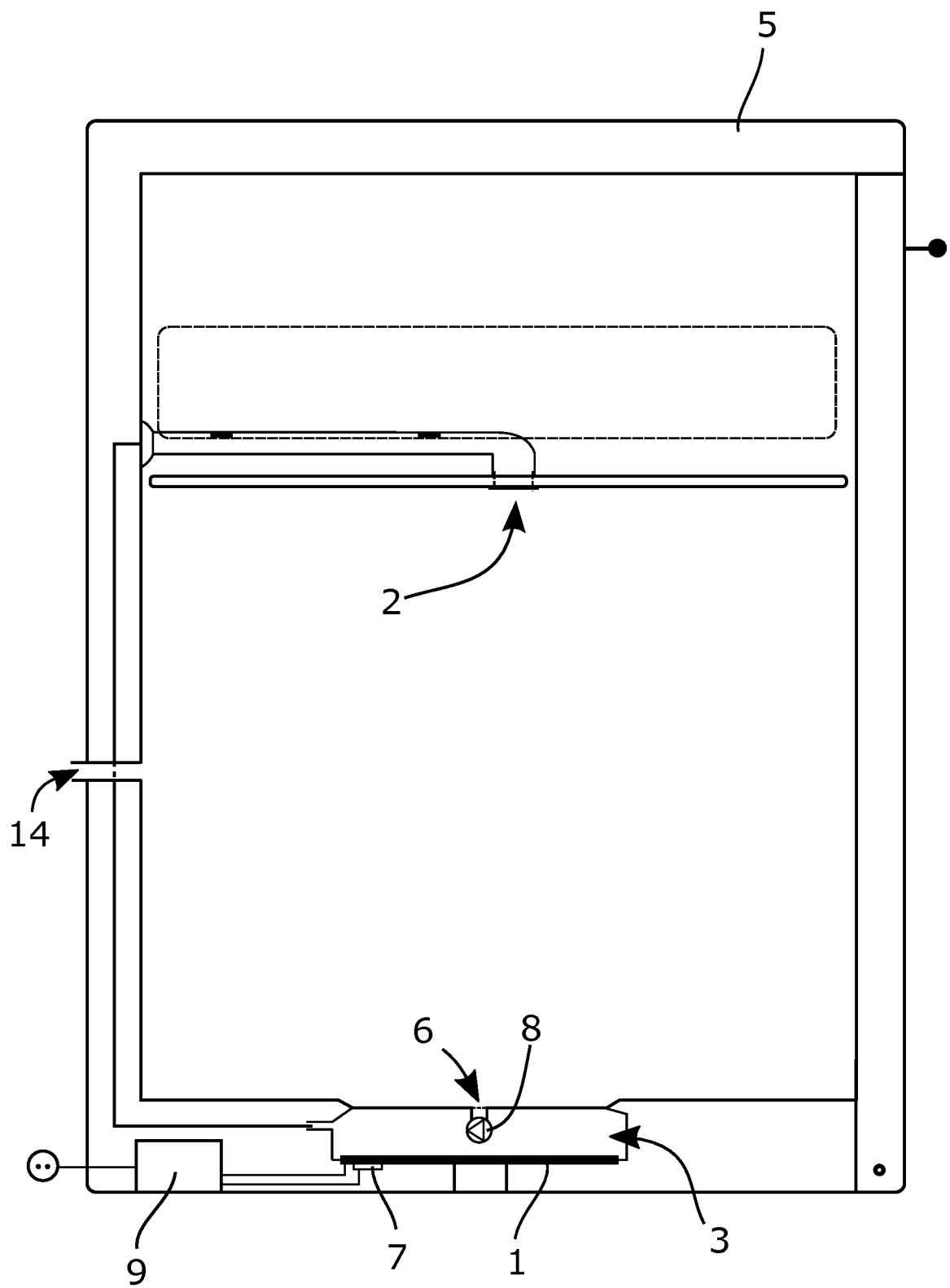
FIG. 3 is a plane view of a household appliance comprising a heating element.

FIG. 1 illustrates an example of actions in a procedure for implementing a method 100 that can be performed for determining if an amount of deposition of scale on a heating element exceeds a reference amount of deposition of scale or not. The method 100 may for example be carried by a control unit connected to or arranged at the household appliance. Such a control unit is shown in FIG. 3 and its function will be described in details in conjunction to description of FIG. 3. In conjunction to the FIG. 3 also other details of the household appliance and theirs function for the method will be described.

The method 100 comprises: measuring 101 temperature of the heating element 1, obtaining 103 a start temperature of the heating element 1, wherein the start temperature corresponds to a liquid start temperature of the liquid in the heating space.

The temperature of the heating element 1 is measured by a sensor (shown in FIG. 3). Because the sensor may measure temperature of the heating element when the heating element is on or off, the temperature of the heating element, when the heating element is cold, i.e. when is not on, may be achieved. The start temperature of the heating element corresponds to temperature of the heating element when the heating element is cold.

Before starting heating the liquid in the heating space by using the heating element and after a time period of for example 10 seconds from stopping filling of the heating space with the liquid, the temperature of the liquid in the heating space will corresponds to the temperature of the heating element. With other words, before turning on the heating element the liquid temperature in the heating space corresponds to the temperature of the heating element. By this, the liquid start temperature may be determined in a simple way by measuring the start temperature of the heating element.

By filling of the heating space by the liquid is meant that the liquid is supplied to the heating space so the heating space is partly or substantially completely filled with the liquid.

The liquid may for example be water or water comprising a detergent.

Further, the method 100 comprises: turning on 105 the heating element at first point in time to heat the liquid from the liquid start temperature and simultaneously starting measuring a time interval from the first point in time, monitoring 107, at a second point in time, a behaviour of the measured temperature of the heating element during heating of the liquid in the heating space in order to determine if a boiling temperature of the liquid has been reached or not, wherein the time interval is measured to the second point in time.

Turning on of the heating element is controlled by a control unit that will be described in conjunction to FIG. 3. Further the control unit may comprise a time measuring device to measure a time period or the time measuring device may be arranged at the household appliance in connection to the control unit. Thereby, the control unit will receive information from the time measuring device regarding the measured time period. Further the control unit is arranged to receive information from the temperature sensor regarding the measured temperature of the heating element. Thus, the control unit is provided with information about the start temperature of the heating element and abut the temperature of the heating element during heating of the heating element from the sensor. The control unit is further arranged to process the information from the sensor in order to create the behaviour of the measured temperature of the heating element and to analyse, i.e. to monitor the behaviour.

The behaviour, which may also be called characteristic of the measured temperature of the heating element, describes how the temperature of the heating element changes during heating of the liquid. In other words, the behaviour illustrates how the heating element reacts during heating of the liquid. Thus, properties and conditions of the heating element may thereby be described by determining and analysing the behaviour of the temperature of the heating element during heating of the liquid. For example a boiling temperature of the liquid heated by the heating element may be determined by monitoring the behaviour of the temperature of the heating element.

The behaviour is obtained by measuring values of the temperature of the heating element which measured values of the temperature may be illustrated as a plot or a chart, for example a line chart. The behaviour of the measured temperature of the heating element will be described in details in conjunction to FIGS. 2a and 2b.

The method 100 further comprises: comparing 109 the measured time interval with a reference heating duration required for heating the liquid from the liquid start temperature to the boiling temperature of the liquid when heated by a reference heating element having the reference amount of deposition of scale and determining 111 if the amount of deposition of scale on the heating element 1 exceeds the reference amount of deposition of scale or not based on the monitoring 107 and on the comparison 109.

The reference heating duration i.e. a reference time period describes how long time is required to heat the liquid from the liquid start temperature to the boiling temperature of the liquid when heated by the reference heating element having the reference amount of deposition of scale. The reference heating duration may be achieved by monitoring and evaluating of a reference behaviour of temperature of the reference heating element during heating of the liquid. The reference heating duration may be achieved before the reference heating element has been mounted in the household appliance or the reference heating duration may be achieved using the reference heating element mounted in the household appliance and intended to be used for the first time. Accordingly, the reference heating element may for example refer to the heating element that is new or to the heating element that has been used in the household appliance but it may be still be used as the reference heating element. Therefore the reference heating element may be the same as the heating element or it may be a different copy of the heating element with similar characteristics when is new.

Information about the reference heating duration is provided to the control unit.

With reference amount of deposition of scale is meant that the amount of deposition of scale is low, i.e. is low enough to consider the heating element almost free from the deposition of scale, for example when the heating element is new. Thus, an amount of deposition of scale below the reference amount of deposition of scale or equal the reference amount of deposition of scale on is considered do not affect significantly the function of the heating element during normal operation of the heating element.

Thus, by monitoring the behaviour of the temperature of the heating element and by comparing the measured time interval with the reference heating duration a simple and reliable method for determining if an amount of deposition of scale, on the heating element exceeds a reference amount of deposition of scale or not. Further, by this method, the heating element does not need to be heated up to temperature of the heating element that may cause damage of the heating element in order to detect if the amount of deposition of scale, exceeds a reference amount of deposition of scale or not, as presented in the prior art documents.

Consequently, an improved method for determining if an amount of deposition of scale on a heating element arranged for heating a liquid in a household appliance exceeds a reference amount of deposition of scale or not is achieved.

According to some embodiments illustrated in FIG. 1, the method 100 may comprise indicating 113 that the amount of deposition of scale on the heating element does not exceed the reference amount of deposition of scale if the monitoring 107 of the behaviour of the temperature of the heating element indicates that the boiling temperature of the liquid has been reached and the comparison 109 indicates that the measured time interval is less or equal the reference heating duration. This situation is described in details in conjunction to FIG. 2a. The household appliance may comprise a display connected to the control unit. Thus, information to a user may be displayed that the deposition of scale on the heating element does not exceed the reference amount of deposition. As an alternative the indication that the amount of deposition of scale on the heating element does not exceed the reference amount of deposition of scale may be a signal within the control unit which enable moving on to, for example, a washing mode of the household appliance.

Further, the method 100 may comprise indicating 115 that the amount of deposition of scale on the heating element exceeds the reference amount of deposition of scale if the monitoring 107 of the behaviour of the temperature of the heating element indicates that the boiling temperature of the liquid has not been reached and the comparison 109 indicates that the measured time interval is greater than the reference heating duration. This situation is described in details in conjunction to FIG. 2b. In a similar way as above, the household appliance may comprise a display connected to the control unit. Thus, information to a user may be displayed that the deposition of scale on the heating element exceeds the reference amount of deposition. As an alternative the indication that the amount of deposition of scale on the heating element exceeds the reference amount of deposition of scale may be a signal within the control unit which stops moving on to, for example, a washing mode of the household appliance and instead for example to starting a descaling process.

According to some embodiments illustrated in FIG. 1, the method 100 may further comprise estimating 117 an additional amount of the deposition of scale exceeding the reference amount of deposition of scale on the heating element as a function of a difference between the measured time interval and the reference heating duration.

Further, the reference heating duration may be obtained when heating the liquid by the reference heating element powered by electricity at a first value of voltage and the heating element may be powered by electricity and the method 100 may further comprise controlling 119 voltage at the heating element to achieve a second value of voltage substantially equal the first value of voltage. This may be done by the control unit that may be arranged to receive information about the first voltage and arranged to control the second voltage.

Figure 2A:
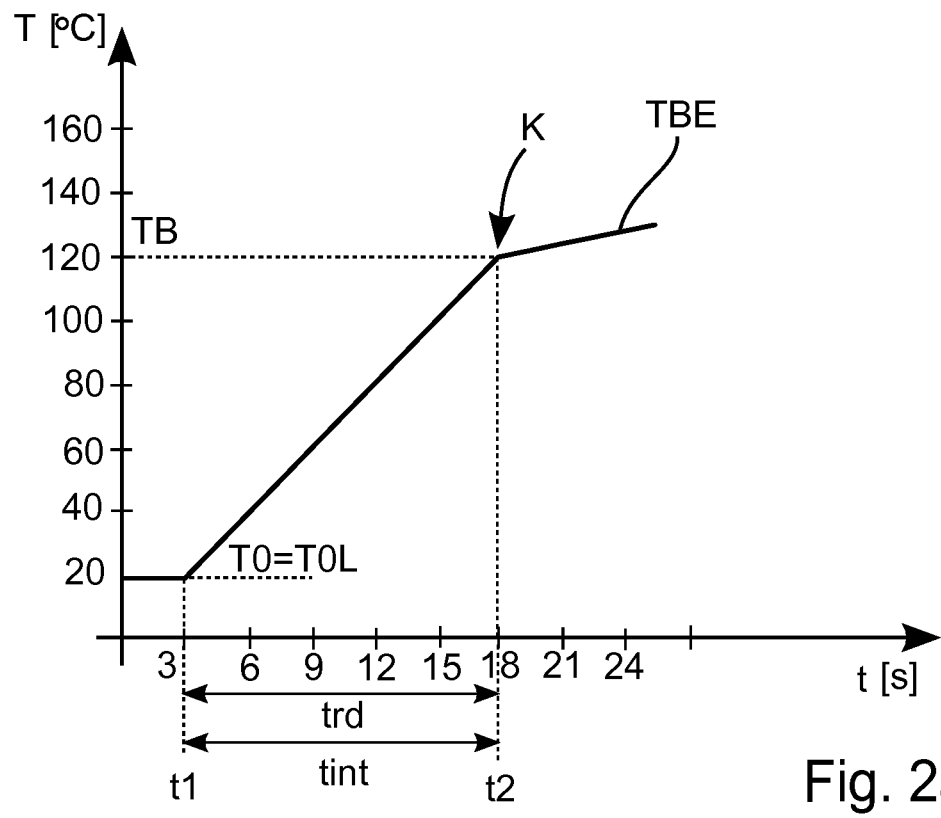
FIG. 2a is a diagram illustrating behaviour of temperature of a heating element with an amount of deposition of scale that not exceeds a reference amount of deposition of scale.

FIG. 2a is a diagram illustrating behaviour TBE of temperature T of a heating element with an amount of deposition of scale that not exceeds a reference amount of deposition of scale. According to FIG. 2a, the heating element is turned on at a first point in time t1 in order to heat a liquid in a heating space. In the illustrated example the temperature T of the heating element rises from an initial value of approximately 20° C. This initial value corresponds to a start temperature T0 of the heating element, which start temperature T0 is measured before turning on the heating element and after the liquid has been supplied to the heating space. According to some embodiments the start temperature T0 may be measured after for example 10 seconds from supplying of the liquid to the heating space. After this time, i.e. for example 10 seconds the liquid in the heating space will reach steady state which means that there is essentially no movement of the liquid in the heating space which results in that temperature of the liquid and temperature of the heating element reach an average value common both for the heating element and the liquid in the heating space. Therefore, by measuring the start temperature T0 of the heating element a liquid start temperature T0L may be achieved.

According to some embodiments the heating element may be turned on at the first point in time t1, which in the example illustrated in FIG. 2a occurs after 3 seconds from considering steady state in the heating space. The temperature T of the heating element increases from the start temperature T0 with approximately a constant derivate up to a boiling temperature TB of the heating element, which temperature corresponds to start boiling of the liquid in the heating space. In the example shown in FIG. 2a the boiling temperature TB is approximately 120° C. The boiling temperature TB of the heating element is determined by monitoring the behaviour TBE of the temperature T of the heating element during heating of the liquid. Because, when the liquid starts boiling the temperature T of the heating element continues to increase with a different derivate than up to boiling, the boiling temperature TB may be determined by detecting a point K at the behaviour TBE when the derivate of the behaviour TBE changes. A point K that is illustrated in FIG. 2a may be called as a boiling point. The boiling point K at the behaviour TBE corresponds to the boiling temperature TB as described above and to second point in time t2. The first point in time t1 and the second point in time t2 define a time interval tint i.e. the time interval tint is measured from the first point in time t1 to the second point in time t2. The time interval tint describes how long time it takes for the heating element to heat the liquid from the liquid start temperature T0L to a boiling temperature of the liquid. If the liquid is water the boiling temperature of the liquid is around 100° C. The behaviour illustrated in FIG. 2a is an example describing situation when water is heated up from approximately 20° C. to boiling temperature of water, which occurs when temperature T of the heating element reaches approximately 120° C.

At the second point in time t2 the behaviour TBE is monitored i.e. the characteristic of the temperature T is evaluated in order to determine if the boiling temperature of the liquid has been reached or not. As described above, this means that the behaviour TBE is monitored to detect the boiling point K which corresponds to start boiling of the liquid. With start boiling of the liquid is meant for example when first air bubbles begin to be formed in the direct vicinity of the heating element.

At the second point in time t2 the time interval tint is measured, which time interval is compared with a reference heating duration trd required for heating the liquid from the liquid start temperature T0L to the boiling temperature of the liquid when heated by a reference heating element.

According to the example illustrated in FIG. 2a the heating duration trd is equal the time interval tint and the boiling point K has been detected, i.e. the boiling temperature of the liquid has been reached at the second point in time t2.

Thus, FIG. 2a illustrates an example when a conclusion may be drawn that the amount of deposition of scale on the heating element does not exceed the reference amount of deposition of scale. When this is concluded a signal may be send to a control unit or to a display at a household appliance (not shown in FIG. 2a).

Figure 2B:
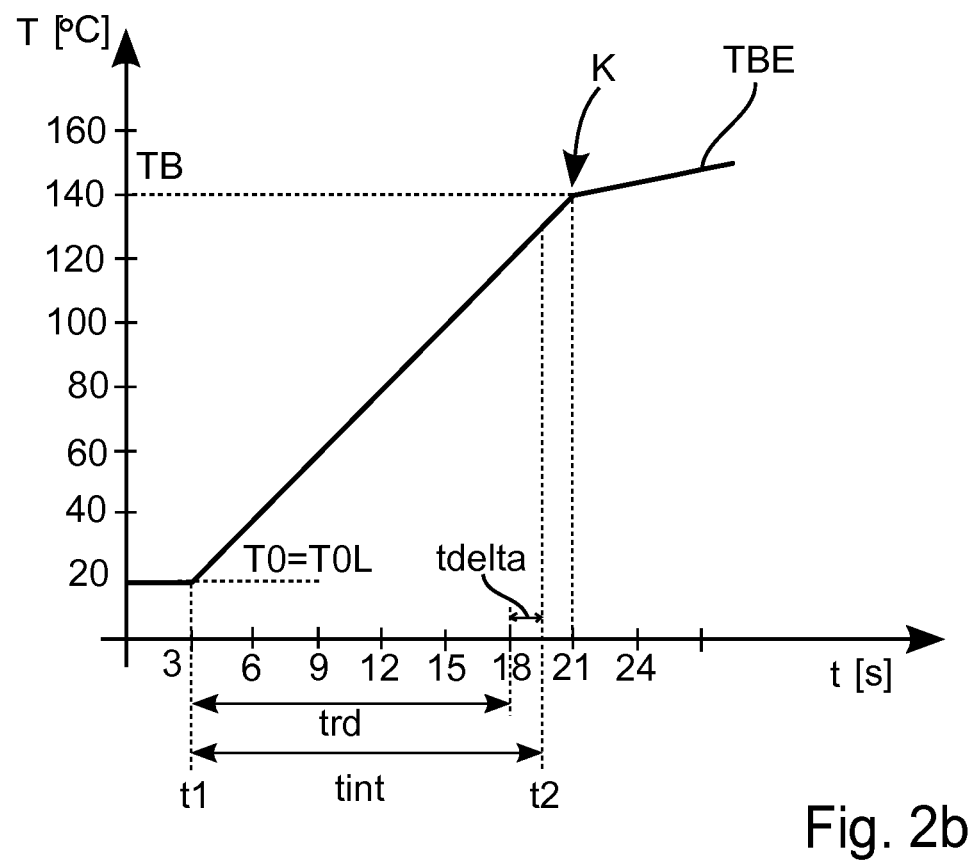
FIG. 2b is a diagram illustrating behaviour of temperature of a heating element with scale deposition exceeding a reference amount of deposition of scale.

FIG. 2b is a diagram illustrating behaviour of temperature of a heating element with scale deposition exceeding a reference amount of deposition of scale.

According to the example illustrated in FIG. 2b at a second point in time t2 no boiling point K has been detected by monitoring the behaviour TBE which indicates that the boiling temperature of the heating element has not been reached at the second point in time t2. Further comparison of the time interval tint with the reference heating duration trd at the second point in time shows that the measured time interval tint is greater than the reference heating duration trd.

Thus, FIG. 2b illustrates an example when a conclusion may be drawn that the amount of deposition of scale on the heating element exceeds the reference amount of deposition of scale. When this is concluded a signal may be send to a control unit or to a display at a household appliance (not shown in FIG. 2a).

Because deposition of scale on a heating element impairs transfer of heat energy from the heating element to a liquid intended to be heated by the heating element, the temperature of the heating element need to be higher to reach a boiling temperature of the liquid.

According to the example illustrated in FIG. 2b the boiling temperature of the liquid will be reached at a boiling temperature TB of the heating element which is approximately 140° C.

Consequently, by the method described herein, a heating element does not need to be heated up to boiling temperature TB, as it is needed to be done according to prior art technology, in order to determine if an amount of deposition of scale on the heating element exceeds s reference amount of deposition of scale or not.

The second point in time t2 and thereby the time interval tint is measured continuously from the first point in time t1, wherein the monitoring of the behaviour TBE and comparison of the time interval with the reference heating duration is also done continuously during heating of the liquid from the first point in time t1.

For example, the second point in time t2 may be measured each 20 millisecond from the first point in time t1.

Further the method may comprise estimating an additional amount of the deposition of scale exceeding the reference amount of deposition of scale on the heating element as a function of a difference tdelta between the measured time interval tint and the reference heating duration trd. Thus, the greater difference tdelta between the measured time interval tint and the reference heating duration trd, the higher amount of the additional amount of the deposition of scale. For example, the additional amount of the deposition of scale may be directly proportional to the difference tdelta between the measured time interval tint and the reference heating duration trd.

FIG. 3 illustrates an example of a household appliance which may be a dishwasher 5 comprising a heating element 1. The heating element 1 is arranged in a cavity 3 where a liquid that, for example may be water, is supplied through an inlet 6 comprising a filter (not shown). Water is supplied to the dishwasher through a second inlet 14. In the cavity 3, water is heated by the heating element 1 and is then pumped to a wash arm arrangement 2 of the dishwasher 5 by a pump 8. The heating element 1 is connected to a power grid through a control unit 9. The heating of the heating element 1 is electrical and is achieved in a regular manner, which is therefore not necessary to described in detail. The control unit 9 may comprises a voltage measuring device (not shown), as for example an ADC, and a time measuring device, as for example a crystal oscillator (not shown). The control unit 9 may also comprise a voltage adapting means (not shown) for adjusting voltage to the heater.

A sensor 7 for, for example a temperature sensor, is arranged on the heating element in order to measure temperature of the heating element 1. The sensor 7 is connected to the control unit 9. The sensor 7 may be any type of sensor as for example a NTC resistor.

The control unit 9 is arranged to receive date about measured temperature of the heating element from the sensor 7 and to enable processing of the received data in order to create behaviour of temperature of the heating element. The behaviour is shown in FIGS. 2a and 2b. Further the control unit is arranged to enable monitoring i.e. evaluating of the behaviour of the temperature of the heating element.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for determining if an amount of deposition of scale, on a heating element arranged for heating a liquid in a heating space of a household appliance, exceeds a reference amount of deposition of scale or not, the method comprises:

measuring, by a temperature sensor, temperature (T) of said heating element, obtaining, by a control unit, a start temperature (T0) of said heating element, wherein said start temperature (T0) of the heating element corresponds to a liquid start temperature (T0L) of said liquid in said heating space, turning on, by the control unit, said heating element at first point in time (t1) to heat the liquid from said liquid start temperature (T0L) and simultaneously starting measuring a time interval (tint) from said first point in time (t1), monitoring, by the control unit, at a second point in time (t2), a rate of temperature change of behavior (TBE) that changes from an initial rate of temperature change of the measured temperature (T) of said heating element during heating of the liquid in the heating space in order to determine that a boiling temperature of said liquid has been reached, wherein said time interval (tint) is measured to said second point in time (t2), comparing, by the control unit, said measured time interval (tint) to a reference heating duration (trd) required for heating said liquid from said liquid start temperature (T0L) to the boiling temperature of said liquid when heated by a reference heating element having the reference amount of deposition of scale, and determining, by the control unit, that an amount of deposition of scale on said heating element exceeds said reference amount of deposition of scale when the comparison indicates that (tint) is greater than (trd) by a predetermined amount of time.

2. The method according to claim 1, comprising indicating that the amount of deposition of scale on said heating element does not exceed said reference amount of deposition of scale if the monitoring of said behavior (TBE) of the temperature (T) of said heating element indicates that the boiling temperature of said liquid has been reached and the comparison indicates that said measured time interval (tint) is less or equal said reference heating duration (trd).

3. The method according to claim 1, comprising indicating that the amount of deposition of scale on said heating element exceeds said reference amount of deposition of scale if the monitoring of said behaviour (TBE) of the temperature (T) of said heating element indicates that the boiling temperature of said liquid has not been reached and the comparison indicates that said measured time interval (tint) is greater than said reference heating duration (trd).

4. The method according to claim 3, comprising estimating an additional amount of the deposition of scale exceeding said reference amount of deposition of scale on said heating element as a function of a difference (tdelta) between said measured time interval (tint) and said reference heating duration (trd).

5. The method according to claim 1, wherein said reference heating duration is obtained when heating the liquid by said reference heating element powered by electricity at a first value of voltage, wherein said heating element is powered by electricity and the method further comprises controlling voltage at said heating element to achieve a second value of voltage substantially equal said first value of voltage.

6. The method according to claim 1, wherein said reference heating duration (trd) is obtained before said method is performed.

7. A household appliance comprising:
a heating element arranged for heating a liquid in a heating space of the household appliance;
a sensor arranged to measure temperature of said heating element; and
a control unit arranged in connection with said heating element and with said sensor, wherein the sensor and the control unit being configured to:
measure temperature of said heating element,
obtain a start temperature of said heating element, wherein said start temperature corresponds to a liquid start temperature of said liquid in said heating space,
turn on said heating element at first point in time to heat the liquid from said liquid start temperature and simultaneously start measuring a time interval from said first point in time,
monitor, at a second point in time, a rate of temperature change of behavior that changes from an initial rate of temperature change of the measured temperature of said heating element during heating of the liquid in the heating space in order to determine that a boiling temperature of said liquid has been reached, wherein said time interval is measured to said second point in time,
compare said measured time interval to a reference heating duration required for heating said liquid from said liquid start temperature to the boiling temperature of said liquid when heated by a reference heating element having the reference amount of deposition of scale, and
determine that an amount of deposition of scale on said heating element exceeds said reference amount of deposition of scale when the comparison indicates that the measured time interval is greater than the reference heating duration by a predetermined amount of time.

8. The household appliance according to claim 7, further being configured to indicate that the amount of deposition of scale on said heating element does not exceed said reference amount of deposition of scale if the monitoring of said behavior of the temperature of said heating element indicates that the boiling temperature of said liquid has been reached and the comparison indicates that said measured time interval is less or equal said reference heating duration.

9. The household appliance according to claim 7, further being configured to indicate that the amount of deposition of scale on said heating element exceeds said reference amount of deposition of scale if the monitoring of said behavior of the temperature of said heating element indicates that the boiling temperature of said liquid has not been reached and the comparison indicates that said measured time interval is greater than said reference heating duration.

10. The household appliance according to claim 9, wherein said control unit further being configured to estimate an additional amount of the deposition of scale exceeding said reference amount of deposition of scale on said heating element as a function of a difference between said measured time interval and said reference heating duration.

11. The household appliance according to claim 7, wherein said reference heating duration is obtained when heating the liquid by said reference heating element powered by electricity at a first value of voltage, wherein said heating element is powered by electricity and the control unit being configured to control voltage at said heating element to achieve a second value of voltage substantially equal said first value of voltage.

* * * * *